United States Patent
Pfeiffer et al.

(10) Patent No.: US 9,950,611 B2
(45) Date of Patent: Apr. 24, 2018

(54) AERODYNAMIC BODY PANEL SYSTEM FOR AIR FLOW MANAGEMENT AT A REAR UNDERSIDE OF A MOTOR VEHICLE

(71) Applicant: FORD GLOBAL TECHNOLOGIES, LLC, Dearborn, MI (US)

(72) Inventors: John Jeffrey Pfeiffer, Saline, MI (US); Michael Joseph Pugliese, Madison Heights, MI (US); Michael George Aimone, Jr., Brownstown Twp, MI (US); Andrew Robert Sourk, Detroit, MI (US); Fernando Andres Velez Garrett, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/070,756

(22) Filed: Mar. 15, 2016

(65) Prior Publication Data
US 2017/0267094 A1    Sep. 21, 2017

(51) Int. Cl.
*B60K 11/08*    (2006.01)
*B62D 35/02*    (2006.01)
*B62D 35/00*    (2006.01)

(52) U.S. Cl.
CPC ............ *B60K 11/08* (2013.01); *B62D 35/007* (2013.01); *B62D 35/02* (2013.01)

(58) Field of Classification Search
CPC ................................ B60K 11/00; B60K 13/02
See application file for complete search history.

(56) References Cited

U.S. PATENT DOCUMENTS

| 6,435,298 B1* | 8/2002 | Mizuno .................. B62D 35/02 180/346 |
| 7,270,206 B2 | 9/2007 | Guertler |
| 2015/0021111 A1 | 1/2015 | Hillstroem et al. |

FOREIGN PATENT DOCUMENTS

| DE | 4102073 A1 | 7/1992 |
| DE | 4319281 A1 | 12/1994 |
| DE | 10350375 A1 | 6/2005 |
| JP | 6199252 A | 7/1994 |

OTHER PUBLICATIONS

English Machine Translation of DE10350375A1.
English Machine Translation of DE4102073A1.
English Machine Translation of DE4319281A1.
English Machine Translation of JP06199252A.

* cited by examiner

*Primary Examiner* — John D Walters
*Assistant Examiner* — James J Triggs
(74) *Attorney, Agent, or Firm* — Jason Rogers; King & Schickli, PLLC

(57) ABSTRACT

A body panel system is provided for a motor vehicle. That body panel system includes a rear diffuser having a front air inlet. Further, that body panel system includes an underbody panel overlying the rear diffuser as well as a first air tunnel formed between the rear diffuser and the underbody panel. Additionally, that body panel system includes a rear valance, including a first vent opening for discharging air received from the first air tunnel. A related method for improving weight distribution and reducing overall weight of a rear differential cooling system is also provided.

12 Claims, 5 Drawing Sheets

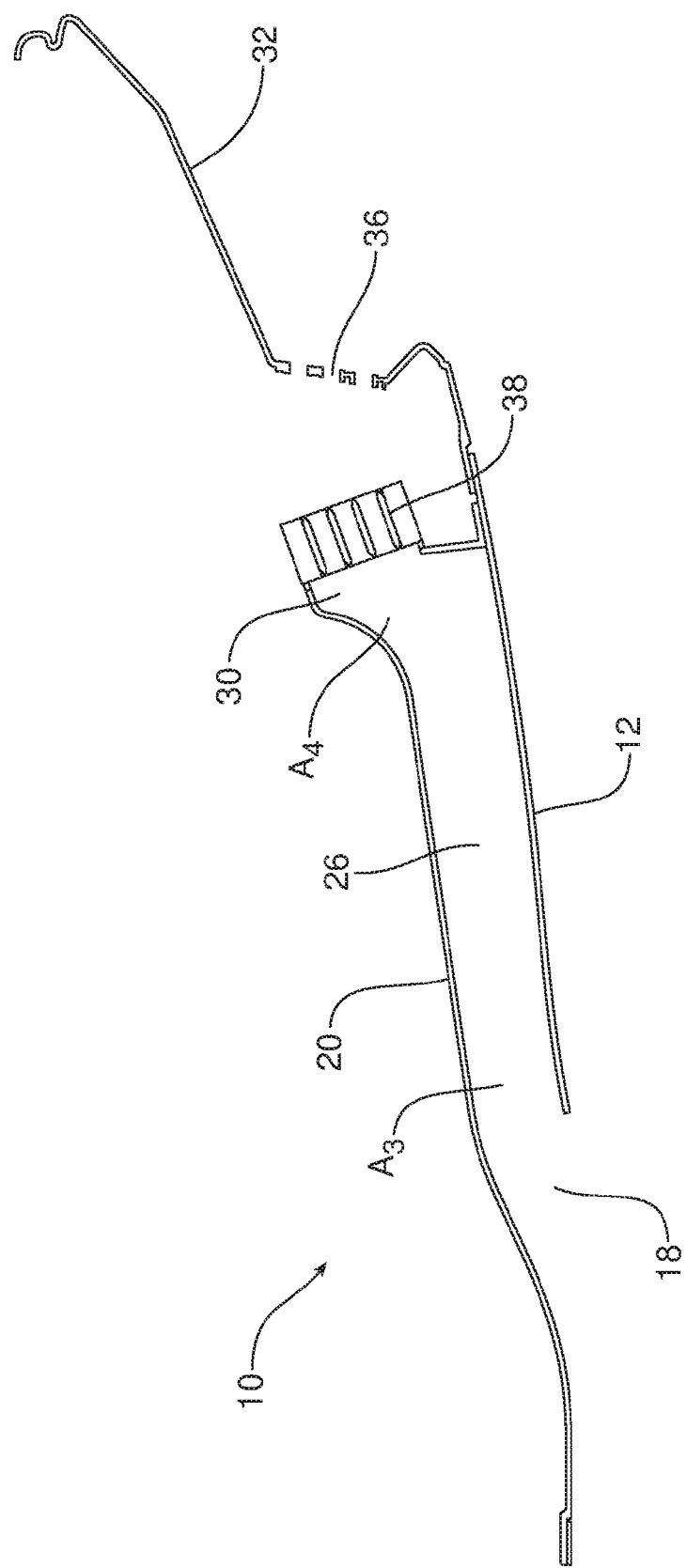

AERODYNAMIC BODY PANEL SYSTEM FOR AIR FLOW MANAGEMENT AT A REAR UNDERSIDE OF A MOTOR VEHICLE

TECHNICAL FIELD

This document relates generally to the motor vehicle equipment field and, more particularly, to an aerodynamic body panel system for managing the air flow at a rear underside of a motor vehicle. A related method is also disclosed.

BACKGROUND

In order to reduce lap times on a race track and increase tire grip, it is necessary to (a) add aerodynamic down force, (b) reduce power losses due to drag and (c) reduce and rebalance weight distribution. Simultaneously achieving these three goals is a very difficult engineering task.

In order to provide race track performance, most powertrain systems require add-on coolers. Traditionally, rear axle or differential coolers are located toward the front of a motor vehicle. As a consequence, these coolers require long lines extending rearwardly from the coolers to the rear differential. Such long lines require more fluid and larger pumps which add weight and deleteriously affect weight distribution. Further, such front-mounted coolers or heat exchangers often tend to have a negative impact on aerodynamic drag and often aerodynamic down force.

Ideally, coolers or heat exchangers for a rear axle or differential should be mounted at the rear of the motor vehicle thereby minimizing negative impacts to aero drag and aero down force. However, providing air flow to a rear-mounted cooler or heat exchanger is very difficult unless it is mounted very low in the motor vehicle where it is at risk of impact from stones and debris. Further, it should be appreciated that many racetrack vehicles also serve a dual function as operator transportation on public roads. Such low mounting of a cooler is also at risk from speed bumps, steep driveway aprons and debris often encountered on public roads.

This document relates to a new and improved aerodynamic body panel system that manages the air stream at the rear end of the motor vehicle in a manner that enhances rear down force and minimizes or reduces aerodynamic drag. Additionally, the aerodynamic body panel system takes advantage of the momentum of the passing air flow to feed air to a rear differential heat exchanger that is mounted rearward in the vehicle behind the rear axle to improve weight distribution and, therefore, motor vehicle handling.

Advantageously, the rear-mounted rear differential heat exchanger is also physically protected thereby reducing the probability or risk of impact from stones, debris and other roadway obstructions.

SUMMARY

In accordance with the purposes and benefits described herein, a body panel system is provided for a motor vehicle. That body panel system comprises a rear diffuser including a front air inlet, an underbody panel overlying the rear diffuser, a first air tunnel formed between the rear diffuser and the underbody panel and a rear valance including a first vent opening for discharging air received from the first air tunnel.

Alternatively, the body panel system may be described as comprising a rear diffuser including a first air inlet and a second air inlet, an underbody panel overlying the rear diffuser, first and second air tunnels formed between the rear diffuser and the underbody panel and a rear valance including a first vent opening for discharging air received from the first air tunnel and the second air tunnel.

The first air tunnel may extend from a first air inlet to a first air tunnel outlet above the rear diffuser. Further, the second air tunnel may extend from a second air inlet to a second air tunnel outlet above the rear diffuser.

The first air tunnel may have a first cross-sectional area $A_1$ at the first air inlet and a second cross-sectional area $A_2$ at the first air tunnel outlet where $A_1<A_2$. The second air tunnel may have a third cross-sectional area $A_3$ at the second air inlet and a fourth cross-sectional area $A_4$ at the second air tunnel outlet where $A_3<A_4$.

The rear valance may also include a second vent opening for discharging air received from the first air tunnel and the second air tunnel.

The first vent opening and the second vent opening may be spaced from the first air tunnel outlet and the second air tunnel outlet. A heat exchanger may be provided between (a) the first vent opening and the second vent opening on one side and (b) the first air tunnel outlet and the second air tunnel outlet on the opposite side. More specifically, the heat exchanger may be provided so as to extend over the first and second air tunnel outlets. The heat exchanger may provide cooling to a rear differential of a motor vehicle.

In still other embodiments, the first vent opening may be aligned with the first air tunnel outlet while the second vent opening may be aligned with the second air tunnel outlet.

In accordance with an additional aspect, a method is provided for reducing the overall weight of a rear differential cooling system as well as improving the weight distribution in a motor vehicle with a front mounted engine. That method includes the steps of: (a) mounting a rear differential heat exchanger vehicle rearward of a rear axle of the motor vehicle, (b) directing air through an air inlet in a rear diffuser of the motor vehicle and then through the rear differential heat exchanger and (c) exhausting that air through a rear valence of the motor vehicle.

The method may also include the step of delivering the air from the air inlet to the rear differential heat exchanger by means of an air tunnel. Further the method may include increasing the cross sectional area of the air tunnel as the air tunnel approaches the rear differential heat exchanger.

In the following description, there are shown and described several preferred embodiments of the body panel system and related method. As it should be realized, the body panel system and method are capable of other, different embodiments and their several details are capable of modification in various, obvious aspects all without departing from the body panel system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the body panel system and together with the description serve to explain certain principles thereof. In the drawing figures:

FIG. 5 is a schematic cross-sectional view of the body panel system illustrating how air is directed through a rear differential heat exchanger and then discharged from the motor vehicle by the body panel system.

Figure 1:
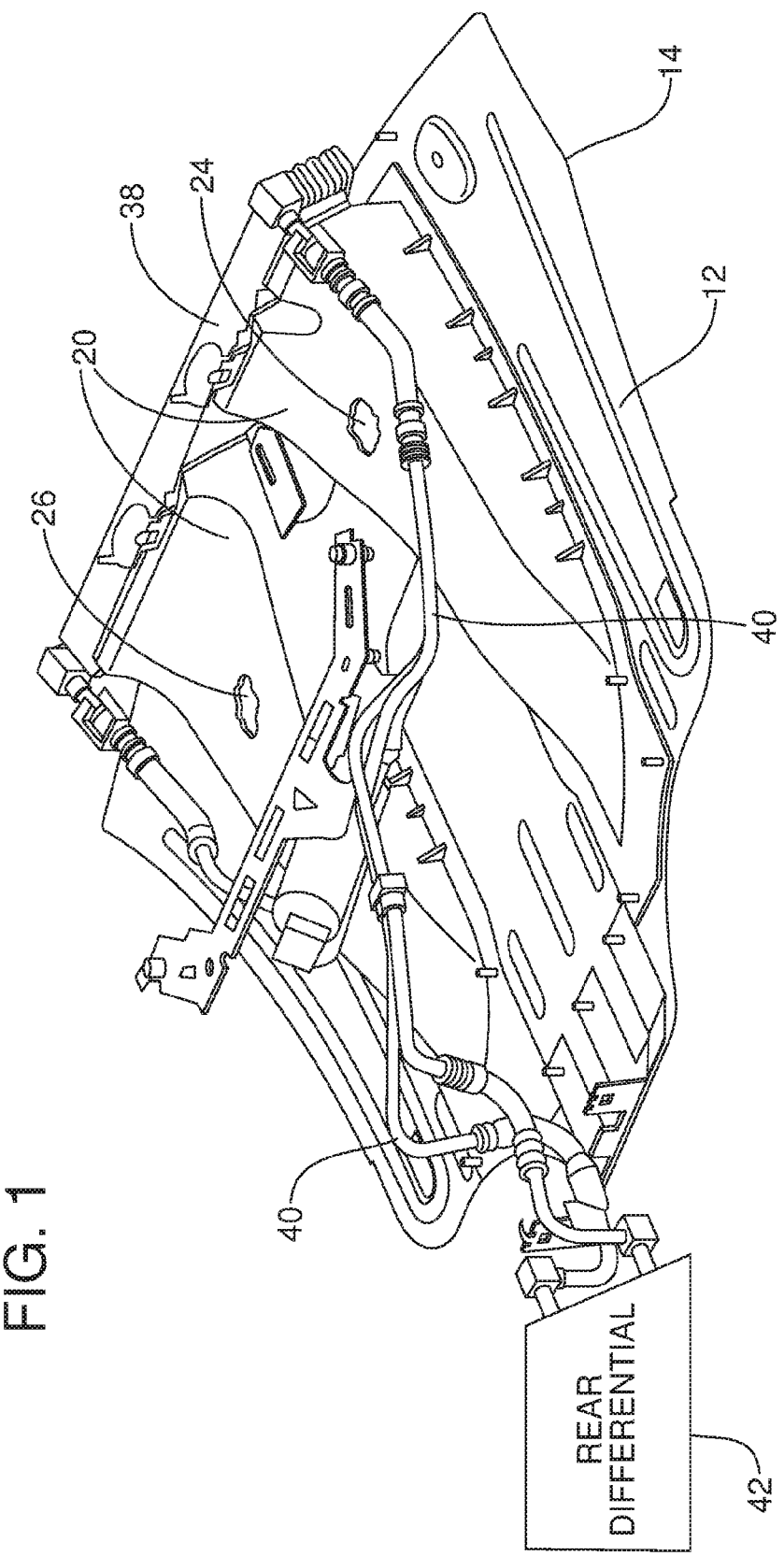
FIG. 1 is a detailed perspective view illustrating the body panel, sans the rear valance, for increasing down force, reducing aerodynamic drag and providing cooling air to a rear differential heat exchanger located vehicle rearward of the rear differential of the motor vehicle.
Figure 2:
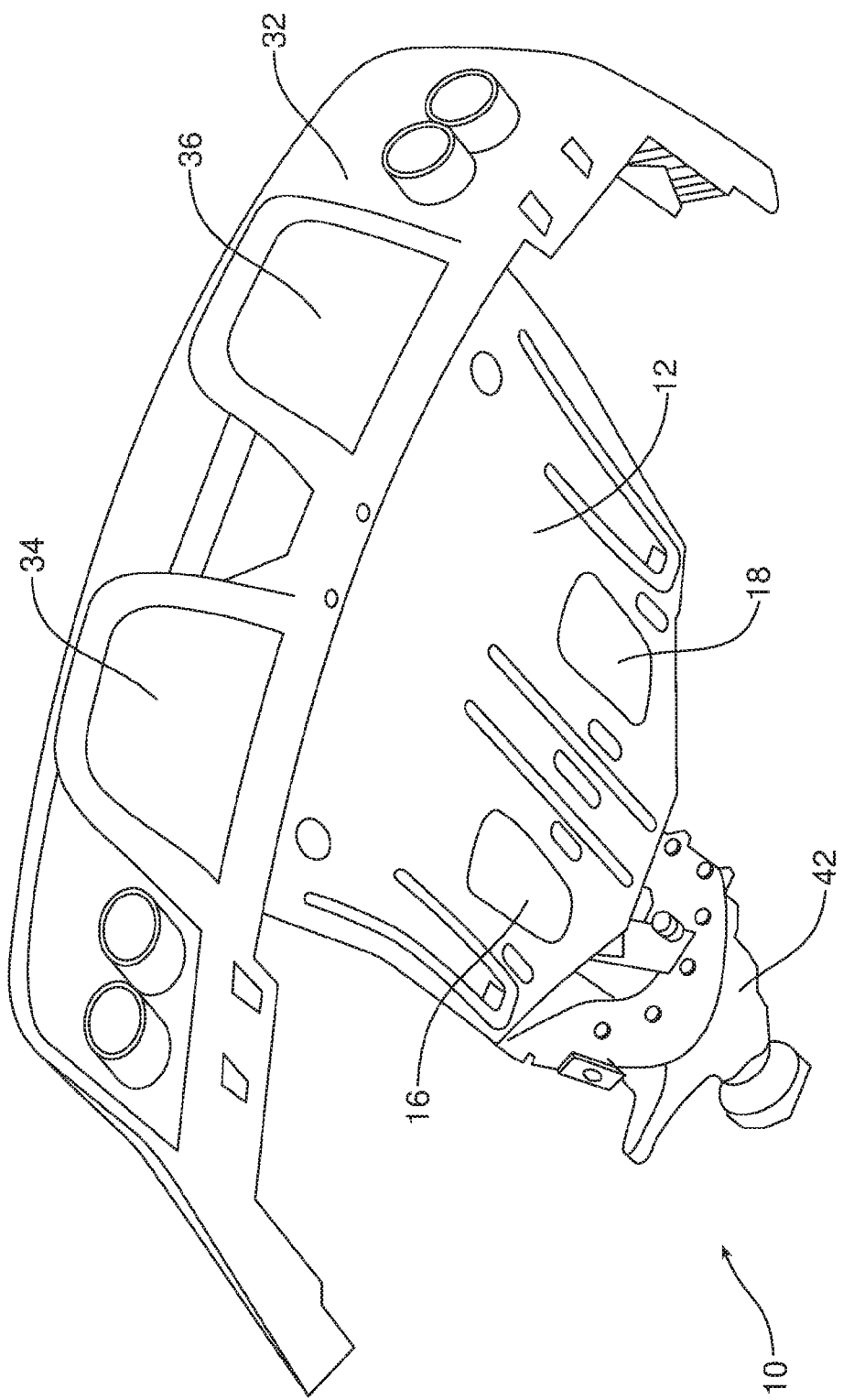
FIG. 2 is a rear perspective view of the body panel system showing the rear valance, including the vent openings for discharging air, and the rear diffuser including the first and second air inlets for drawing air into the first and second air tunnels or ducts which direct air to the rear differential heat exchanger.

Reference will now be made in detail to the present preferred embodiments of the body panel system, an example of which are illustrated in the accompanying drawing figures.

DETAILED DESCRIPTION

Reference is now made to FIGS. 1-5, illustrating the aerodynamic body panel system 10. That body panel system 10 includes a rear diffuser 12 including a vortex generator 14, for producing down force, a first air inlet 16 and a second air inlet 18.

Figure 3:
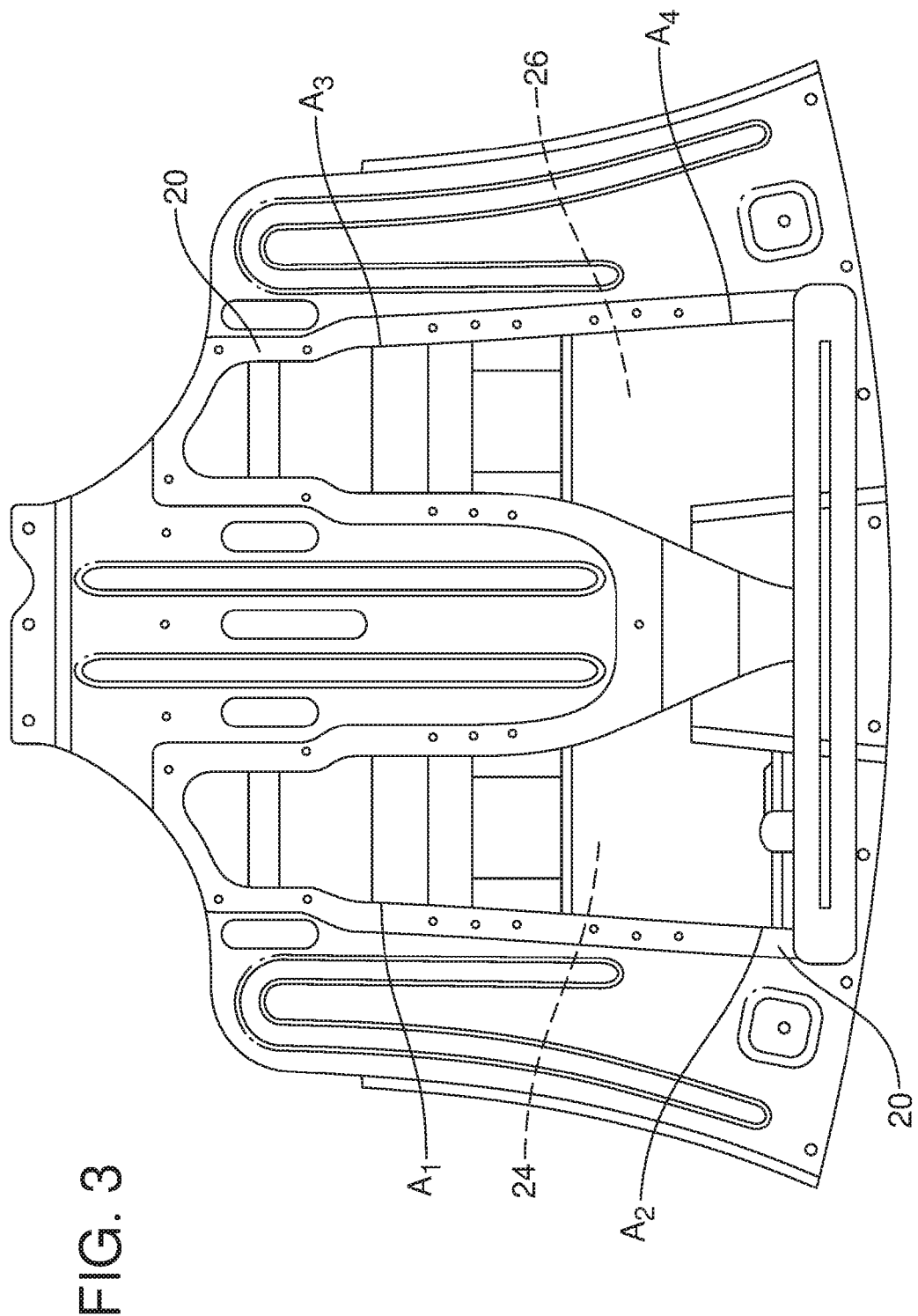
FIG. 3 is a top plane view of the body panel system sans the rear valance.
Figure 4:
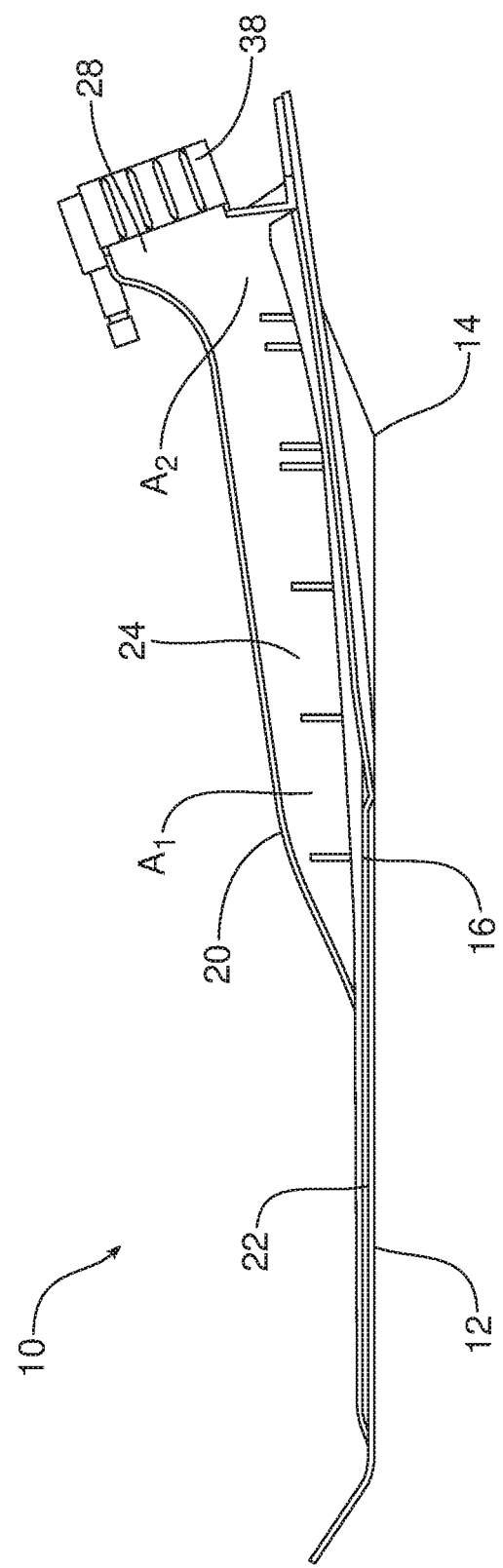
FIG. 4 is a schematic cross-sectional view of the body panel system sans the rear valance.

The body panel system 10 also includes an underbody panel 20 that is secured to the upper surface 22 of the rear diffuser 12. As best illustrated in FIGS. 3-5, a first air tunnel or duct 24 is formed between the upper surface 22 of the rear diffuser 12 and the underbody panel 20. Similarly, a second air tunnel or duct 26 is formed between the upper surface 22 of the rear diffuser 12 and the underbody panel 20. As illustrated, the two air tunnels 24, 26 are provided side by side.

As best illustrated in FIG. 4, the first air tunnel 24 extends from the first air inlet 16 in the rear diffuser 12 to a first air tunnel outlet 28 above the rear diffuser. As best illustrated in FIG. 5, the second air tunnel 26 extends from the second air inlet 18 in the rear diffuser to a second air tunnel outlet 30 above the rear diffuser.

The first air tunnel 24 has a first cross-sectional area $A_1$ at the first air inlet 16 and a second cross-sectional area $A_2$ at the first air tunnel outlet 28 where $A_1 < A_2$. Thus, it should be appreciated that the cross-sectional area of the first air tunnel 24 increases as air moves from the first air inlet 16 toward the first air tunnel outlet 28.

The second air tunnel 26 has a third cross-sectional area $A_3$ at the second air inlet 18 and a fourth cross-sectional area $A_4$ at the second air tunnel outlet 30 where $A_3 < A_4$. Thus, the cross-sectional area of the second air tunnel increases as air moves from the second air inlet 18 toward the second air tunnel outlet 30. The function of the change in cross-sectional area will be described below.

The aerodynamic body panel system 10 also includes a rear valance 32. See FIGS. 2 and 5. In the illustrated embodiment, the rear valance 32 includes a first vent opening 34 and a second vent opening 36 for discharging air received from the first and second air tunnels 24, 26. As illustrated, the first and second vent openings 34, 36 are spaced from the first and second air tunnel outlets 28, 30. Further, the first vent opening 34 in the rear valance 32 is aligned with the first air tunnel outlet 28 while the second vent opening 36 in the rear valance is aligned with the second air tunnel outlet 30.

A heat exchanger 38 may be provided in the space between (a) the first and second vent openings 34, 36 on one side and the first and second air tunnel outlets 28, 30 on the other side. More specifically, that heat exchanger 38 may be provided over the first and second air tunnel outlets 28, 30. The heat exchanger 38 may be connected by feed lines 40 to the rear differential 42 of the motor vehicle. See FIG. 1. In such an embodiment, the heat exchanger 38 provides a cooling function to the rear differential 42. As illustrated, the heat exchanger 38 is provided motor vehicle rearward of the rear differential 42 and rear axle (not shown) of the motor vehicle. As should be appreciated, the feed lines 40 between the rear differential 42 and such a rearwardly located heat exchanger 38 are much shorter than they would otherwise be if the heat exchanger were located in the forward portion of the motor vehicle. Advantageously, weight savings result from the shorter feed lines 40, the need for less cooling fluid in the cooling system and the need for a less robust and more lightweight pump. Further, the relocation of the heat exchanger 38 from the front of the motor vehicle to the rear of the motor vehicle behind the rear differential 42 improves the weight distribution of the motor vehicle thereby enhancing motor vehicle handling.

As should be appreciated from reviewing FIGS. 3-5, a portion of the air flowing under the motor vehicle will be drawn upwardly into the respective first and second air tunnels 24, 26 through the first and second air inlets 16, 18 provided in the rear diffuser 12. That air will flow through the first and second air tunnels 24, 26 between the upper surface 22 of the rear diffuser 12 and the underbody panel 20 toward the first and second air tunnel outlets 28, 30.

As previously noted, the first and second air tunnels 24, 26 both provide an increasing cross-sectional area as they extend between the first and second air inlets 16, 18 to the first and second air tunnel outlets 28, 30. As a consequence, air flowing through the first and second air tunnels 24, 26 toward the heat exchanger 38 decreases in velocity so as to flow more smoothly and with minimal turbulence through the heat exchanger 38 thereby cooling the coolant circulating in the feed lines 40 between the heat exchanger 38 and the rear differential 42. After the air passes through the heat exchanger 38 it is exhausted from the motor vehicle through the first and second vent openings 34, 36 provided in the rear valance 32.

Significantly, it should also be appreciated that the heat exchanger 38, provided at the end of the first and second air tunnels 24, 26 above the rear diffuser 12 is well protected from rocks and road debris. Toward this end the first and second air inlets 16, 18 may also be covered with a mesh if desired to prevent intrusion of objects into the first and second air tunnels 24, 26. Of course, it should also be appreciated that the rear diffuser 12 also protects the heat exchanger 38 from direct contact with speed bumps and steeply sloped driveway aprons when the motor vehicle is driven on public roads.

Consistent with the above description, a method is also provided which not only reduces the overall weight of the rear differential cooling system but also improves weight distribution in a motor vehicle equipped with a front mounted engine. Improved handling and race track performance is a consequence of these benefits.

The method may be generally described as including the steps of: a) mounting a rear differential heat exchanger 38 motor vehicle rearward of a rear differential 42 of the motor vehicle, (b) directing air through an air inlet 16, 18 in a rear diffuser 12 of the motor vehicle and then through the rear differential heat exchanger, and (c) exhausting or discharging that air through a rear valance 32 of the motor vehicle. In some embodiments, the method further includes the step of delivering the air from the air inlet 16, 18 to the rear differential heat exchanger 38 by means of an air tunnel 24, 26. In addition, the method may include the step of increasing a cross-sectional area of the air tunnel 24, 26 as the air tunnel approaches the rear differential heat exchanger 38.

The foregoing has been presented for purposes of illustration and description. It is not intended to be exhaustive or to limit the embodiments to the precise form disclosed. Obvious modifications and variations are possible in light of the above teachings. For example, while not illustrated, it should be appreciated that the air being drawn through the first and second air inlets of 16, 18 and the first and second air tunnels 24, 26 may also be utilized to cool other operating components of the motor vehicle rearward of the rear differential 42 if desired. All such modifications and variations are within the scope of the appended claims when interpreted in accordance with the breadth to which they are fairly, legally and equitably entitled.

What is claimed:

1. A body panel system for a motor vehicle, comprising:
   a rear diffuser including a first air inlet;
   an underbody panel overlying said rear diffuser;
   a first air tunnel formed between said rear diffuser and said underbody panel and extending from said first air inlet to a first tunnel air outlet above said rear diffuser; and
   a rear valance including a first vent opening for discharging air received from said first air tunnel.

2. The body panel system of claim 1, wherein said first air tunnel has a first cross-sectional area $A_1$ at said first air inlet and a second cross-sectional area $A_2$ at said first air tunnel outlet where $A_1 < A_2$.

3. The body panel system of claim 2, wherein said first vent opening is spaced from said first air tunnel outlet.

4. The body panel system of claim 3, wherein a heat exchanger is provided between said first vent opening and said first air tunnel outlet.

5. The body panel system of claim 4, wherein said heat exchanger is provided over said first air tunnel outlet.

6. The body panel system of claim 5, wherein said heat exchanger provides cooling for a rear differential of said motor vehicle.

7. A body panel system for a motor vehicle, comprising:
   a rear diffuser including a first air inlet and a second air inlet;
   an underbody panel overlying said rear diffuser;
   a first air tunnel formed between said rear diffuser and said underbody panel and extending from said first air inlet to a first air tunnel outlet above said rear diffuser;
   a second air tunnel formed between said rear diffuser and said underbody panel and extending from said second air inlet to a second air tunnel outlet above said rear diffuser; and
   a rear valance including a first vent opening for discharging air received from said first air tunnel and said second air tunnel.

8. The body panel system of claim 7, wherein said first air tunnel has a first cross-sectional area $A_1$ at said first air inlet and a second cross-sectional $A_2$ at said first air tunnel outlet and said second air tunnel has a third cross-sectional area $A_3$ at said second air inlet and a fourth cross-sectional area $A_4$ at said second air tunnel outlet where $A_1 < A_2$ and $A_3 < A_4$.

9. The body panel system of claim 8, wherein said rear valance includes a second vent opening for discharging air received from said first air tunnel and said second air tunnel.

10. The body panel system of claim 9, wherein said first vent opening and said second vent opening are spaced from said first air tunnel outlet and said second air tunnel outlet.

11. The body panel system of claim 10, wherein a heat exchanger is provided between (a) said first vent opening and said second vent opening and (b) said first air tunnel outlet and said second air tunnel outlet.

12. The body panel system of claim 11, wherein said heat exchanger is provided over said first air tunnel outlet and said second air tunnel outlet.

* * * * *